US008422685B2

(12) United States Patent
Al-Somani et al.

(10) Patent No.: US 8,422,685 B2
(45) Date of Patent: Apr. 16, 2013

(54) METHOD FOR ELLIPTIC CURVE SCALAR MULTIPLICATION

(75) Inventors: Turki F. Al-Somani, Makkah (SA); Alaaeldin Amin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 74 days.

(21) Appl. No.: 13/215,078

(22) Filed: Aug. 22, 2011

(65) Prior Publication Data
US 2012/0008780 A1  Jan. 12, 2012

Related U.S. Application Data (63) Continuation-in-part of application No. 12/071,779, filed on Feb. 26, 2008, now abandoned.

(51) Int. Cl.
*H04L 9/00* (2006.01)
(52) U.S. Cl.
USPC .......................................... 380/277; 380/28
(58) Field of Classification Search .......... 380/277–286, 380/44–47, 28
See application file for complete search history.

(56) References Cited

U.S. PATENT DOCUMENTS

| | | |
|---|---|---|
| 6,285,761 B1 | 9/2001 | Patel et al. |
| 6,876,745 B1 | 4/2005 | Kurumatani |
| 6,986,054 B2 | 1/2006 | Kaminaga et al. |
| 7,000,111 B1 | 2/2006 | Dent et al. |

(Continued)

FOREIGN PATENT DOCUMENTS

| | | | |
|---|---|---|---|
| EP | 1296224 | | 3/2003 |
| JP | 2003131568 A | * | 5/2003 |
| JP | 2004117627 A | * | 4/2004 |
| WO | WO 2007051305 A1 | * | 5/2007 |

OTHER PUBLICATIONS

Al-Somani, May 2006, "Design and Analysis of Efficient and Secure Elliptic Curve Cryptoprocessors", King Fahd University of Petroleum and Minerals.

(Continued)

*Primary Examiner* — Eleni Shiferaw
*Assistant Examiner* — Jing Sims
(74) *Attorney, Agent, or Firm* — Richard C. Litman

(57) ABSTRACT

The method for elliptic curve scalar multiplication may provide several countermeasures to protect scalar multiplication of a private key k by a point P to produce the product kP from power analysis attacks. First, the private key, k, is partitioned into a plurality of key partitions, which are processed in a random order, the resulting points being accumulated to produce the scalar product kP. Second, in each partition, the encoding is randomly selected to occur in binary form or in Non-Adjacent Form (NAF), with the direction of bit inspection being randomly assigned between most-to-least and least-to-most. Third, in each partition, each zero in the key may randomly perform a dummy point addition operation in addition to the doubling operation. The method may be implemented in software, smart cards, circuits, processors, or application specific integrated circuits (ASICs) designed to carry out the method.

3 Claims, 7 Drawing Sheets

U.S. PATENT DOCUMENTS

| | | |
|---|---|---|
| 2003/0194086 A1 | 10/2003 | Lambert |
| 2004/0010689 A1 | 1/2004 | Vanstone et al. |
| 2005/0105723 A1 | 5/2005 | Dupaquis et al. |
| 2005/0169462 A1 | 8/2005 | Jung et al. |
| 2006/0029220 A1 | 2/2006 | Ibrahim |
| 2006/0090081 A1 | 4/2006 | Baentsch et al. |
| 2006/0093137 A1 | 5/2006 | Izu et al. |
| 2006/0098814 A1 | 5/2006 | Al-Khoraidly et al. |
| 2006/0140398 A1 | 6/2006 | Avanzi |
| 2008/0273695 A1* | 11/2008 | Al-Gahtani et al. ............ 380/30 |
| 2008/0301459 A1* | 12/2008 | Ebeid ............................ 713/180 |

OTHER PUBLICATIONS

Al-Somani, T. F. and Ibrahim, M. K., "Generic-point parallel scalar multiplication without precomputations", *IEICE Electronics Express*, 6, 24, 1732-1736, (2009).

Al-Somani, T. F., "Performance Analysis of the Postcomputation-based Generic-Point Parallel Scalar Multiplication Method", *Global Journal of Computer Science and Technology (GJCST)*, vol. 10, Issue 11, pp. 32-37, (2010).

\* cited by examiner

METHOD FOR ELLIPTIC CURVE SCALAR MULTIPLICATION

CROSS-REFERENCE, TO RELATED APPLICATION

This application is a continuation-in-part of U.S. patent application Ser. No. 12/071,779, filed on Feb. 26, 2008.

BACKGROUND OF THE INVENTION

1. Field of the Invention

The present invention relates to a method for elliptic curve scalar multiplication, and more particularly, to methods of modifying or manipulating an elliptic curve cryptographic key to render the encryption resistant to power analysis attacks, and to software, smart cards, circuits, processors, or application specific integrated circuits (ASICs) designed to carry out the method.

2. Description of the Related Art

Elliptic Curve Cryptosystems (ECC), originally proposed by Niel Koblitz and Victor Miller in 1985, offer a serious alternative to earlier public key cryptosystems, such as Rivest-Shamir-Adleman (RSA) and ElGamal, with much shorter key size. To date, no significant breakthroughs have been made in determining weaknesses in the ECC algorithm, which is based on the discrete logarithm problem over points on an elliptic curve. The fact that the problem appears so difficult to crack means that key sizes can be reduced considerably, even exponentially. This has caused ECC to become a serious challenger to RSA and ElGamal cryptosystems. Because of these advantages, ECC have been recently incorporated in many standards. ECC have gained popularity for cryptographic applications because of the short key, and are considered to be particularly suitable for implementation on smart cards or mobile devices.

Power analysis attacks on such devices are considered serious threats due to the physical characteristics of these devices and their use in potentially hostile environments. Power analysis attacks seek to break the security of these devices through observing their power consumption trace or the timing of computations. Careless or naive implementations of cryptosystems may allow power analysis attacks to infer the secret key or obtain partial information about the secret key. Thus, designers of such systems seek to introduce algorithms that are not only efficient, but also resistant to power analysis attack.

An elliptic curve over a finite field $GF(q)$ defines a set of points $(x,y)$ that satisfy the elliptic curve equation together with the point O, known as the "point at infinity". The "point at infinity" does not satisfy the elliptic curve equation. The coordinates x and y of the elliptic curve points are elements of the field $GF(q)$, where $q=p^m$ and p is prime.

Equations (1) and (2) define the elliptic curve equations for the fields $GF(p)$ and $CF(2^m)$, respectively:

$$y^2 = x^3 + ax + b \qquad (1)$$

where $a, b \in GF(p)$ and $4a + 27b^2 \neq 0 \pmod{p}$; and $$y^2 = xy = x^3 + ax^2 + b \qquad (2)$$

where $a, b \in GF(2^m)$ and $b \neq 0$.

The set of discrete points on an elliptic curve form an abelian group (commutative group), whose group operation is known as point addition. Bounds for the number of discrete points n on an elliptic curve over a finite field $GF(q)$ are defined by Hasse's theorem, given in Equation (3), where the symbol n represents the number of points on the elliptic curve and where $q=p^m$ represents the number of elements in the underlying finite field.

$$q+1-2\sqrt{q} \leq n \leq q+1+2\sqrt{q} \qquad (3)$$

Elliptic curve "point addition" is defined according to the "chord-tangent process". Point addition over $GF(p)$ is described as follows.

Figure 2:
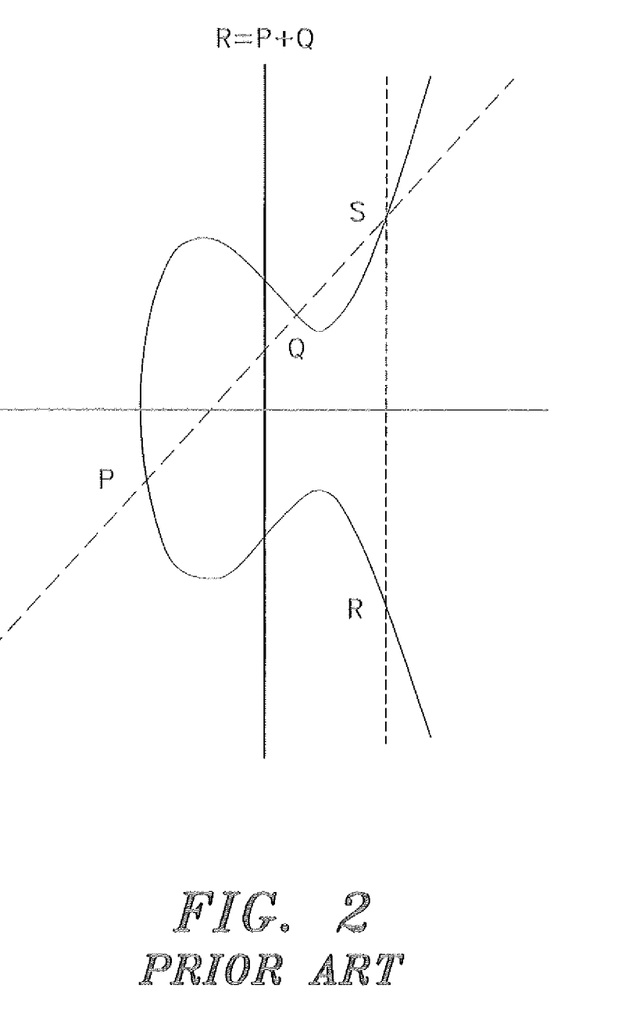
FIG. 2 is a graph illustrating elliptic curve point addition according to the prior art.

Let P and Q be two distinct points on an elliptic curve E defined over the real numbers with $Q \neq -P$ (Q is not the additive inverse of P). The addition of P and Q is the point R (R=P+Q) where R is the additive inverse of S, and S is a third point on the elliptic curve intercepted by the straight line through points P and Q. For the curve under consideration, R is the reflection of the point S with respect to the x-axis, that is, if R is the point (x, y), S is the point (x, -y). The addition operation just described is illustrated in FIG. 2.

Figure 3:
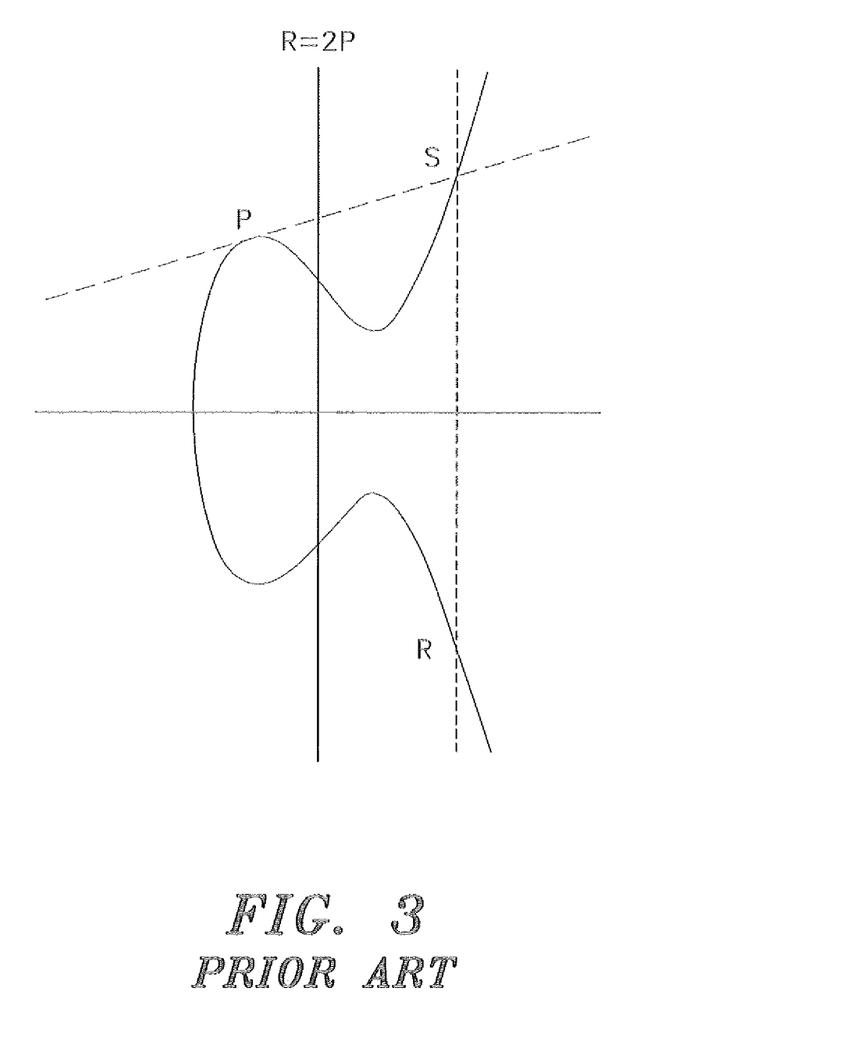
FIG. 3 is a graph illustrating elliptic curve point doubling according to the prior art.

When P=Q and $P \neq -P$, the addition of P and Q is the point R (R=2P) where R is the additive inverse of S, and S is the third point on the elliptic curve intercepted by the straight line tangent to the curve at point P. This operation is referred to as "point doubling," and is shown in FIG. 3.

The "point at infinity", O, is the additive identity of the group. The most relevant operations involving O are the following: the addition of a point P and O is equal to P (P+O=P); and the addition of a point P and its additive inverse, -P, is equal to O (P-P=O). If P is a point on the curve, then -P is also a point on the curve.

The point operation used by elliptic curve cryptosystems is referred to as point multiplication. This operation is also referred to as scalar point multiplication. The point multiplication operation is denoted as kP, where k is an integer number and P is point on the elliptic curve. The operation kP represents the addition of k copies of point P, as shown in Equation (4).

$$kP = \underbrace{P + P + \ldots + P}_{k \text{ times } P} \qquad (4)$$

Elliptic curve cryptosystems are built over cyclic groups. Each group contains a finite number of points, n, that can be represented as scalar multiples of a generator point: iP for i=0, 1, ..., n-1, where P is a generator of the group. The order of point P is n, which implies that nP=O and $iP \neq O$ for $1 \leq i \leq n-1$. The order of each point on the group must divide n. Consequently, a point multiplication kQ for k>n can be computed as (k mod n)Q.

Scalar multiplication is the basic operation for ECC. Scalar multiplication in the group of points of an elliptic curve is the analogue of exponentiation in the multiplicative group of integers modulo a fixed integer m. Computing kP can be performed using a straightforward double-and-add approach based on the binary representation of $k=k_{i-1}, \ldots, k_0$ where $k_{i-1}$ is the most significant bit of k. Other scalar multiplication methods have been proposed in the literature.

One of the simplest scalar multiplication algorithms is the double-and-add point multiplication algorithm, which is the so-called binary algorithm. Algorithms 1 and 2 show the most-to-least and the least-to-most versions of the double-and-add scalar multiplication algorithms, respectively. The algorithms inspect the multiplier k. For each inspected bit, the algorithms perform a point double, and if the inspected bit is one, the algorithms also perform a point add.

---
Algorithm 1: Double-and-Add (most-to-least)
---

Inputs: P, k
Output: kP
Initialization:
    Q = P
Scalar Multiplication:
    for i = l−2 down to 0 do
        Q = 2Q
        if $k_i$ = 1 then Q = Q + P
    end for
return(Q)

---
Algorithm 2: Double-and-Add (least-to-most)
---

Inputs: P, k
Output: kP
Initialization:
    Q = O, R = P
Scalar Multiplication:
    for i = 0 to l−1 do
        if $k_i$ = 1 then Q = Q + R
        R = 2R
    end for
return(Q)

The double-and-add scalar multiplication algorithms require, on average, l point doubles and l/2 point additions, where l≈⌊$\log_2$ k⌋. These algorithms also require the storage of two points, P and Q.

The security of an elliptic curve cryptosystem may be compromised by a power analysis attack. Power analysis attacks may be a particular problem for portable devices, such as smart cards, that draw their power supply from an external source. The cryptographic system in such devices is generally implemented with semiconductors, and the current drawn by the semiconductors continuously changes when performing the computations and other operations involved in implementing the cryptographic algorithms. By placing a resistor in series with the power supply and using an oscilloscope to measure the voltage drop across the resistor, the changes in current and therefore power consumption during each clock cycle can be measured and plotted to obtain a power trace. The power traces may reveal information about the instructions being executed and the contents of the data registers, making it possible to deduce the secret key.

Power analysis attacks are usually divided into two types. The first type, Simple Power Analysis (SPA), may be based on a single observation of power consumption, while the second type, Differential Power Analysis (DPA), combines SPA attack with an error-correcting technique using statistical analysis over multiple observations of power consumption. More importantly, classical DPA attacks have been extensively researched for each cryptosystem, and new types of DPA are continuously being developed. Many of the existing countermeasures are vulnerable to the more recent attacks, which include Refined Power Analysis (RPA), Zero Power Analysis (ZPA), Doubling Attack, and Address-Bit Differential Power Analysis (ADPA).

An SPA attack may consist of observing the power consumption during a single execution of a cryptographic algorithm. The operations involved in elliptic curve point addition and elliptic curve point doubling produce distinctive power traces that can be readily distinguished upon simple visual observation. The power consumption analysis may also enable one to distinguish between point addition and point doubling in the double-and-add algorithm. The sequence of the point addition and point doubling operations may enable the attacker to determine the individual bits of the secret key k in the scalar multiplication kP, from which the public key may be easily deduced.

Coron showed that, for Algorithm 1 to be SPA resistant, the instructions performed during a cryptographic algorithm should not depend on the data being processed, there should not be any branch instructions conditioned by the data, etc. This could be done by performing the addition and doubling each time and then, at the end of the loop, decide whether to accept the result or to eliminate the addition part according to value of k, (see Algorithms 3 and 4). However, even though this scheme is resistant to a SPA attack, it remains vulnerable to a DPA attack.

---
Algorithm 3: Double-and-Add Always (most-to-least)
---

Input P, k
Q[0] ← P
for i from l− 2 to 0 do
    Q[0] ← 2Q[0]
    Q[1] ← Q[0] + P
    Q[0] ← Q[$k_i$]
output Q[0]

---
Algorithm 4: Double-and-Add Always (least-to-most)
---

Input P, k
Q[0] ← P
Q[1] ← O
for i from 0 to l− 1 do
    Q[2] ← Q[0] + Q[1]
    Q[0] ← 2Q[0]
    Q[1] ← Q[1 + $k_i$]
output Q[1]

A DPA attack is based on the same basic concept as an SPA attack, but uses error correction techniques and statistical analysis to extract very small differences in the power consumption signals. To be resistant to a DPA attack, some system parameters or computation procedures must be randomized.

Coron suggested three countermeasures to protect against DPA. The first countermeasure is randomization of the private exponent, as follows. Let #E be the number of points of the curve. The computation of Q=kP is done by: selecting a random tri-bit number d; computing k'=k+d#E; and computing the point Q=k'P. Thus, Q=kP, since #EP=O.

The second countermeasure is blinding point P. The point P to be multiplied is "blinded" by adding a secret random point R for which we know S=kR. Scalar multiplication is done by computing the point k(R+P) and subtracting S=kR to get Q=kP.

The third countermeasure is randomizing projective coordinates. The projective coordinates of a point are not unique because:

$$(X,Y,Z)=(\lambda X, \lambda Y, \lambda Z) \tag{5}$$

for every $\lambda \neq 0$ in the finite field. The third countermeasure randomizes the projective coordinate representation of a point P=(X,Y,Z). Before each new execution of the scalar multiplication algorithm for computing Q=kP, the projective coordinates of P are randomized with a random value λ. The randomization can also occur after each point addition and doubling.

An enhanced version of Coron's third countermeasure has been proposed by Joye and Tymen. It uses an isomorphism of an elliptic curve, thereby transposing the computation into another curve through a random morphism. The elliptic point P=(X,Y,Z) and parameters (a, b) of the defined curve equation can be randomized, e.g., to $(\lambda^2 X, \lambda^3 Y, Z)$ and $(\lambda^4 a, \lambda^6 b)$, respectively. However, all of the above countermeasures add computational overhead and are still vulnerable to differential power attacks, as described below.

The doubling attack obtains the secret scalar using binary elliptic scalar multiplication. It only works for the most-to-least version of the double-and-add algorithm. The main idea of this attack is based on the fact that, even if an adversary cannot see whether the computation being done is doubling or addition, he can still detect when the same operation is done twice. More precisely, if 2A and 2B are computed in any operations, the attacker is not able to guess the value of A or B but he can check if A=B or A≠B. This assumption is reasonable, since this kind of computation usually takes many clock cycles and depends greatly on the value of the operands. If the noise is negligible, a simple comparison of the two power traces during the doubling will be efficient to detect this equality.

Two of Coron's three proposed countermeasures against DPA attacks fail to protect against a doubling attack, viz., randomizing the private scalar (exponent) and blinding the point. However, his third countermeasure, the randomized projective coordinate does protect against a doubling attack, as does a randomized exponentiation algorithm, such as the Ha and Moon algorithm, which maps a given scalar to one of various representations. Since the positions of the zeros in the Ha and Moon algorithm vary in each representation, the doubling attack cannot detect the positions of the zeros for the doubling operation.

Basically, to protect against a doubling attack, the random blinding point R should be randomly updated. A regularly updated method should not be chosen. A method similar to Coron's third countermeasure or a random field isomorphism should be used.

Goubin proposed a new power analysis in 2003, namely, the Refined Power Analysis (RPA), which works even if one of the three countermeasures with an SPA countermeasure is applied. The RPA attack assumes that the attacker can input adaptively chosen messages or elliptic curve points to the victim exponentiation algorithm. Smart analyzed the RPA attack in detail and discounted its effectiveness in a large number of cases. For the remaining cases, Smart proposed a defense against the RPA attack based on isogenies of small degree. However, the RPA attack is still a threat to most elliptic curve cryptosystems.

The Zero-value Point Attack (ZPA) is an extension of the RPA attack. In an RPA attack, the attacker uses a special point, which has a zero-value coordinate. In a ZPA attack, on the other hand, an attacker utilizes an auxiliary register, which might take a zero-value in the definition field. As a result, Coron's third or random field isomorphism countermeasures do not protect against ZPA attacks.

To protect against RPA and ZPA attacks, the base point P or the secret scalar k should be randomized. For example, Coron's first two countermeasures protect against these attacks. Mamiya et al. recently proposed a countermeasure called BRIP, which uses a random initial point R. The proposed countermeasure computes kP+R and then subtracts R to get kP. Thus, no special point or zero-value register will appear during all operations and, hence, it is resistant against both RPA and ZPA attacks.

In 1999, Messerges et. al. proposed a new attack against secret key cryptosystems, the address-bit DPA (ADPA), which analyzes a correlation between the secret information and the addresses of registers. Itoh et. al., in 2002, extended this attack to Elliptic Curve-based Cryptosystems. Basically, the ADPA Attack is based on the correlation between bit values of the scalar and the location (address) of the variables used in a scalar multiplication algorithm. Countermeasures used to protect against simple power analysis and differential power analysis that are based on randomization of the base point or the projective coordinate do not provide countermeasures against address-bit analysis attacks. Therefore, these countermeasures do not remove the correlation between the bit values of a scalar and the location (address) of the variables used in a scalar multiplication algorithm.

A hardware-based DPA countermeasure proposed by May et. al. is based on Randomized Register Renaming (RRR). RRR is supposed to be implemented on a processor called NDISC, which can execute instructions in parallel. In other words, it requires special hardware to work. Itoh et al. also has proposed several countermeasures against the ADPA attack, but those countermeasures double the computing time.

In 2003, Itoh et al. proposed a countermeasure called the Randomized Addressing method (RA), which is similar to RRR but does not require special hardware. In RA, the addresses of registers are randomized by a random number for each scalar exponentiation. Thus, all addresses of registers are randomized and, hence, the side channel information is also randomized.

However, none of theses approaches, taken either singly or in combination, is seen to describe the instant invention as claimed. Thus, a method for elliptic curve scalar multiplication solving the aforementioned problem's is desired.

SUMMARY OF INVENTION

The method for elliptic curve scalar multiplication may provide several countermeasures to protect scalar multiplication of a private key k by a point P to produce the product kP from power analysis attacks. First, the private key, k, is partitioned into a plurality of key partitions, which are processed in a random order, the resulting points being accumulated to produce the scalar product kP. Second, in each partition, the encoding is randomly selected to occur in binary form or in Non-Adjacent Form (NAF), with the direction of bit inspection being randomly assigned between most-to-least and least-to-most. Third, in each partition, each zero in the key may randomly perform a dummy point addition operation in addition to the doubling operation. The method may be implemented in software, smart cards, circuits, processors, or application specific integrated circuits (ASICs) designed to carry out the method.

When partitioning the key, each key partition is associated with a pre-computed point to keep its significance. The pre-computed points are computed off-line and stored to be reused as needed. In order to increase resistance against power analysis attacks, the key partitioning process, i.e., defining new key partition sizes and pre-computing the corresponding values of the pre-computed points, is repeated from time to time.

The number of key partitions is preferably more than two. Increasing the number of key partitions increases resistance to power analysis attacks, since each additional key partition provides more permutations. Increasing the number of key partitions, however, requires more storage for the pre-computed points and more point addition operations to assimilate the partial computations into the final scalar product kP, so that the number of key partitions depends upon the particular application (e.g., a smart card vs. a laptop personal computer with built-in hard disk) and the desired balance between security and memory or speed.

Randomly altering the form of digit representation within each partition, randomly altering the bitwise order of point multiplication within each partition, and randomly providing for dummy addition operations further increases resistance to power analysis attacks. The zeros randomization provided by dummy addition operations, for example, increases the security and saves an average of 50% of the extra dummy point additions used in the double-and-add always algorithms (Algorithms 3 and 4).

The multilevel protection scheme fully confuses any relation between the secret key and any information leaked through power analysis attacks, resulting in a fairly secure system with minimal area and delay overhead. An attacker of such a system will be totally confused with leaked information from such a multilevel resistance security environment.

In an alternative embodiment, the elliptic curve private key k is represented in binary form as $k=(k_{m-1}, \ldots, k_0)$, where m is an integer and $k_{m-1}$ is a most significant bit of k. The binary form is then stored in computer readable memory. A relatively small integer value u is then defined, along with a rational number v, where $$v = \frac{m}{u},$$

and the values of u and v are stored in the computer readable memory.

Following this, (uv−m) zero bits are then appended to the left side of the binary representation of k to form an appended elliptic curve private key, and the appended elliptic curve private key is stored in the computer readable memory. The appended elliptic curve private key is then partitioned into u partitions, each having a length of v, such that $k=k^{(n-1)}\|k^{(n-2)}\| \ldots \|k^{(1)}\|k^{(0)}$.

Each partition is then distributed to a respective one of u parallel processors. The final step is computing a scalar multiplication product kP as $kP=2^v(\ldots 2^v(2^vk^{(u-1)}P+k^{(u-2)}P)+ \ldots +k^{(1)}P)+k^{(0)}P$, where $k^{(i)}P=2(\ldots 2(2k_{iv+v-1}P+k_{iv+v-2}P)+ \ldots +k_{iv+1}P)+k_{iv+0}P$ for $0 \leq i \leq u-1$, where each $k^{(i)}P$ is computed on a respective one of the u parallel processors, with the computations of $k^{(i)}P$ being computed simultaneously in parallel.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a method for elliptic curve scalar multiplication. The method for elliptic curve scalar multiplication may provide several countermeasures to protect scalar multiplication of a private key k by a point P to produce the product kP from power analysis attacks. First, the private key, k, is partitioned into a plurality of key partitions, which are processed in a random order, the resulting points being accumulated to produce the scalar product kP. Second, in each partition, the encoding is randomly selected to occur in binary form or in Non-Adjacent Form (NAF). Third, for binary encoded partitions, the direction of bit inspection is randomly assigned between most-to-least and least-to-most. Fourth, in each partition, each zero in the key may randomly perform a dummy point addition operation in addition to the doubling operation. The method may be implemented in software on a computer, or in smart cards, circuits, processors, telephones, or application specific integrated circuits (ASICs) designed to carry out the method.

When partitioning the key, each key partition is associated with a pre-computed point to keep its significance. The pre-computed points are computed off-line and stored to be reused as needed. In order to increase resistance against power analysis attacks, the key partitioning process, i.e., defining new key partition sizes and precomputing the corresponding values of the pre-computed points, is repeated from time to time.

The key is divided into u partitions as:

$$k=k^{(u-1)}\|k^{(u-2)}\| \ldots \|k^{(1)}\|k^{(0)}.$$

To compute the scalar product kP, these partitions are associated with a set of pre-computed points to keep the significance of each key partition. Thus, these partitions can be processed independently, either sequentially or in parallel.

$$\begin{aligned} kP &= (k^{(u-1)} \| k^{(u-2)} \| \ldots \| k^{(1)} \| k^{(0)}) \cdot P \\ &= (2^{size(n-1)} \cdot k^{(u-1)} + 2^{size(u-2)} \cdot k^{(u-2)} + \ldots + 2^{size(1)} \cdot k^{(1)} + k^{(0)}) \cdot P \\ &= (2^{size(u-1)}P) \cdot k^{(u-1)} + (2^{size(u-2)}P) \cdot \\ &\quad k^{(u-2)} + \ldots + (2^{size(1)}P) \cdot k^{(1)} + (P)k^{(0)} \\ &= P_{u-1} \cdot k^{(u-1)} + P_{u-2} \cdot k^{(u-2)} + \ldots + P_1 \cdot k^{(1)} + P_0 k^{(0)} \\ &= P_{u-1} \cdot k^{(u-1)} + P_{u-2} \cdot k^{(u-2)} + \ldots + P_1 \cdot k^{(1)} + P k^{(0)} \end{aligned}$$

where $P_i$ (i=1, 2, ..., u−1) is the pre-computed point associated with key partition $k^{(i)}$ and $$size(j) = \sum_{i=0}^{j-1} (\text{size of key partition } k^{(i)}).$$

Thus, each partition $k^{(i)}$ is associated with a pre-computed point $P_i$, forming the pair $(k^{(i)}, P_i)$, where $P_0=P$.

Expressed differently, when the binary scalar k of m-bit length is converted to decimal, the expansion may be expressed as follows:

$$k = (k_{m-1} \times 2^{m-1}) + (k_{m-2} \times 2^{m-2}) + \ldots + (k_1 \times 2^1) + (k_0 \times 2^0)$$

$$= \sum_{i=0}^{m-1} (k_i \times 2^i).$$

For each binary digit of k, the power to which the number two is raised is the order of the digit. Assuming that the scalar k is partitioned into u partitions, each of the partitions having a length of j bits (j may be a different length in each of the partitions), the value of the scalar for each partition may be converted to decimal by a summation from the most significant digit in the partition to the least significant digit in the partition in which each term is the product of the value of the digit times two raised to the order of the digit. By the distributive law, the product kP is equal to the summation of a series of partial products in which each term represents the value of the scalar for a partition times P. However, two raised to a power equal to the order of the least significant digit in the scalar for the partition may be factored out of each term in the summation. In the present invention, each partition is associated with a pre-computed point equal to P times two raised to a power equal to the order of the least significant digit in the partition. The following example illustrates the method.

Let k=1001__1000__1011__0111. Then:

$$kP = (1001100010110111)P$$
$$= \begin{pmatrix} 1*2^{15} + 0*2^{14} + 0*2^{13} + 1*2^{12} + \\ 1*2^{11} + 0*2^{10} + 0*2^9 + 0*2^8 + \\ 1*2^7 + 0*2^6 + 1*2^5 + 1*2^4 + \\ 0*2^3 + 1*2^2 + 1*2^1 + 1*2^0 \end{pmatrix} P$$

Assume that the key k is divided into four partitions (u=4), as follows:

k={10010}{001}{01101}{11}, so that:
$k^{(0)}$=11→size(length) of this key partition is 2 bits
$k^{(1)}$=01101→size(length) of this key partition is 5 bits
$k^{(2)}$=001→size(length) of this key partition is 3 bits
$k^{(3)}$=100110→size(length) of this key partition is 6 bits Thus, we can write the value of the scalar product as follows:

$$kP = \{1*2^{15} + 0*2^{14} + 0*2^{13} + 1*2^{12} + 1*2^{11} + 0*2^{10}\}P +$$
$$\{0*2^9 + 0*2^8 + 1*2^7\}P +$$
$$\{0*2^6 + 1*2^5 + 1*2^4 + 0*2^3 + 1*2^2\}P + \{1*2^1 + 1*2^0\}P$$

Factoring out two raised to the order of the least significant digit in the scalar of each partition, this is equal to:

$$kP = \{1*2^5 + 0*2^4 + 0*2^3 + 1*2^2 + 1*2^1 + 0*2^0\}2^{10}P +$$
$$\{0*2^2 + 0*2^1 + 1*2^0\}2^7 P +$$
$$\{0*2^4 + 1*2^3 + 1*2^2 + 0*2^1 + 1*2^0\}2^2 P +$$
$$\{1*2^1 + 1*2^0\}2^0 P$$
$$= \{1*2^1 + 1*2^0\}P$$

Setting the pre-computed point for each partition equal to P times two raised to the order of the least significant digit of the partition (this may alternately be expressed as two raised to a power equal to the sum of the sizes of the preceding partitions), the scalar product becomes:

$$kP = \{1*2^5 + 0*2^4 + 0*2^3 + 1*2^2 + 1*2^1 + 0*2^0\}P_3 +$$
$$\{0*2^2 + 0*2^1 + 1*2^0\}P_2 +$$
$$\{0*2^4 + 1*2^3 + 1*2^2 + 0*2^1 + 1*2^0\}P_1 + \{1*2^1 + 1*2^0\}P_0$$

where:

$P_0 = 2^0 P$ $P_1 = 2^2 P$ $P_2 = 2^7 P = 2^{2+5}$ $P_3 = 2^{10} P = 2^{2+5+3} P$ $kP = k^{(3)}P_3 + k^{(2)}P_2 + k^{(1)}P_1 + k^{(0)}P_0$

The key partition sizes may be equal or different. While equal sizes allow for simpler design, different size key partitions provide more security.

For u key partitions, the required number of pre-computed points is (u−1). The resulting points from processing these key partitions are assimilated at the end to produce the scalar multiplication product $$kP = \sum_{i=0}^{u-1} k^{(i)} P_i \text{ where } P_0 = P.$$

A new set of pre-computed points should be generated whenever the base point P or the number or sizes of key partitions are changed. In elliptic curve Diffie-Hellman protocol, precomputations are performed off-line only once, at the beginning, since the base points of the two parties are not changed. Precomputations, however, should be performed whenever the number or size of any of the key partitions is changed.

Alternatively, in elliptic curve ElGamal protocol, the public point of the receiver is considered as the sender's base point. Accordingly, the sender uses this point, together with his own key partitions, to compute the required pre-computed points once off-line. If another session is established between the two parties, new pre-computed points need to be generated only if the sender changes his/her private key, the number of key partitions or the size of one or more of these partitions. The receiver, on the other hand, needs to generate a new set of pre-computed points whenever the sender changes his/her private key, or when the number or size of any of the receiver key partitions is changed.

To further protect against power analysis attacks, several resistance measures may be adopted to render the scalar multiplication process secure against these attacks. The private key consists of a group of bits, with every bit having a particular position and a particular bit value. The resistance measures depend upon confusing not only the bit values, but also the key bit positions. Thus, even if leaked information can identify the type of operation performed, e.g., point doubling or point addition, attackers can neither be sure of the corresponding key bit value nor its position.

Several resistance measures are proposed at different levels, including at the key level, at the key partition level, and at the bit level. These resistance measures are described below.

The objective of the resistance measures at the key level is to confuse the key bit positions. Thus, leaked information cannot be associated with a known key bit position. The key is divided into u partitions, which are sequentially processed in a randomized order to increase the resistance against power analysis attacks. The number of key partitions and their sizes are changed from time to time, which requires computing new associated pre-computed points. Such computation is performed off-line.

At the key partition level, two resistance measures against power analysis attacks are proposed. First, in order to confuse the bit value, the encoding of each key partition is randomized to use either binary encoding or NAF encoding. In NAF encoding, signed binary digit representation is used, i.e., each bit may be 0, 1, or −1. NAF has the property that no two consecutive bits are nonzero. Every integer has a unique NAF encoding. Moreover, NAF encoding has the fewest nonzero bits of any binary signed digit representation of an integer (see Algorithm 5, below)

Second, to confuse the bit position, if binary encoding is selected in a particular key partition, the direction of bit inspection for this key partition is randomly assigned to be either most-to-least or least-to-most. This adds another level of resistance, even if an attacker guessed correctly that a certain bit belongs to a certain key partition.

---

Algorithm 5: NAF encoding algorithm

Inputs: A positive integer k.
Output: NAF(k).
Initialization:
i=0
While k ≧ 1 do
    if k mod 2 = 1 then
        $k_i' = 2 - (k \bmod 2^2)$
        $k = k - k_i'$
    else
        $k_i' = 0$
    k = k/2
    i = i + 1
Output(k')

---

In the double-and-add always algorithm (Algorithms 3 and 4), point doubling and point addition are performed in each iteration, regardless of the key bit value $k_i$. In Algorithms 3 and 4, the value of $k_i$ is inspected such that if $k_i=1$, the results of doubling and addition are committed; otherwise, if $k_i=0$, only the result of doubling is committed, while that of addition is ignored.

This simple approach caused scalar multiplication to be resistant against SPA only. The drawback of this approach is the delay overhead due to the extra dummy point additions and its vulnerability to DPA. In the method of the present invention, a dummy point addition is randomly performed if $k_i=0$. Thus, if the value of $k_i$ is zero, a dummy point addition operation may or may not be performed, based upon the value of some random bit r as follows: if r=1, perform the doubling operation together with a dummy addition operation; otherwise if r=0, only the doubling operation is performed.

The most-to-least version of the randomized bit algorithm is given in Algorithm 6. In Algorithm 6, point doubling is always performed at the step Q[0]=2Q[0]. Point additions are performed according to the value of $k_i$ and the random bit r. Similarly, Algorithm 7 shows the least-to-most version of the randomized bit algorithm. In Algorithm 7, point addition is performed according to the value of $k_i$ and the random bit r, while point doubling is always performed the step Q[0]=2Q[0].

---

Algorithm 6: The Randomized Bit Algorithm (most-to-least)

Inputs: P: A pre-computed point; k: A key partition; L:
is the length of key partition k in bits
Output: kP: Partial scalar product
Initialization:
    Q[0]= P·$k_{(L-1)}$ where $k_{(L-1)}$ is the leftmost bit of the key
            partition "k"
Scalar multiplication:
for i from (L−2) to 0 do
    Q[0] = 2Q[0]
    if ($k_i$ = 1 or r = 1) then
        Q[1] = Q[0] + P
    Q[0]= Q[$k_i$]
Output ( Q[0] )

---

Algorithm 7: The Randomized Bit Algorithm (least-to-most)

Inputs: P: A pre-computed point; k: A key partition; L:
is the length of key partition k in bits
Output: kP: Partial scalar product
Initialization:
    Q[0]= P
    Q[1]= O
Scalar multiplication:
for i from 0 to L−1 do
    if ($k_i$ = 1 or r = 1) then
        Q[2] = Q[1] + Q[0]
    Q[0] = 2Q[0]
    Q[1] = Q[1+$k_i$]
Output ( Q[1] )

---

Figure 1:
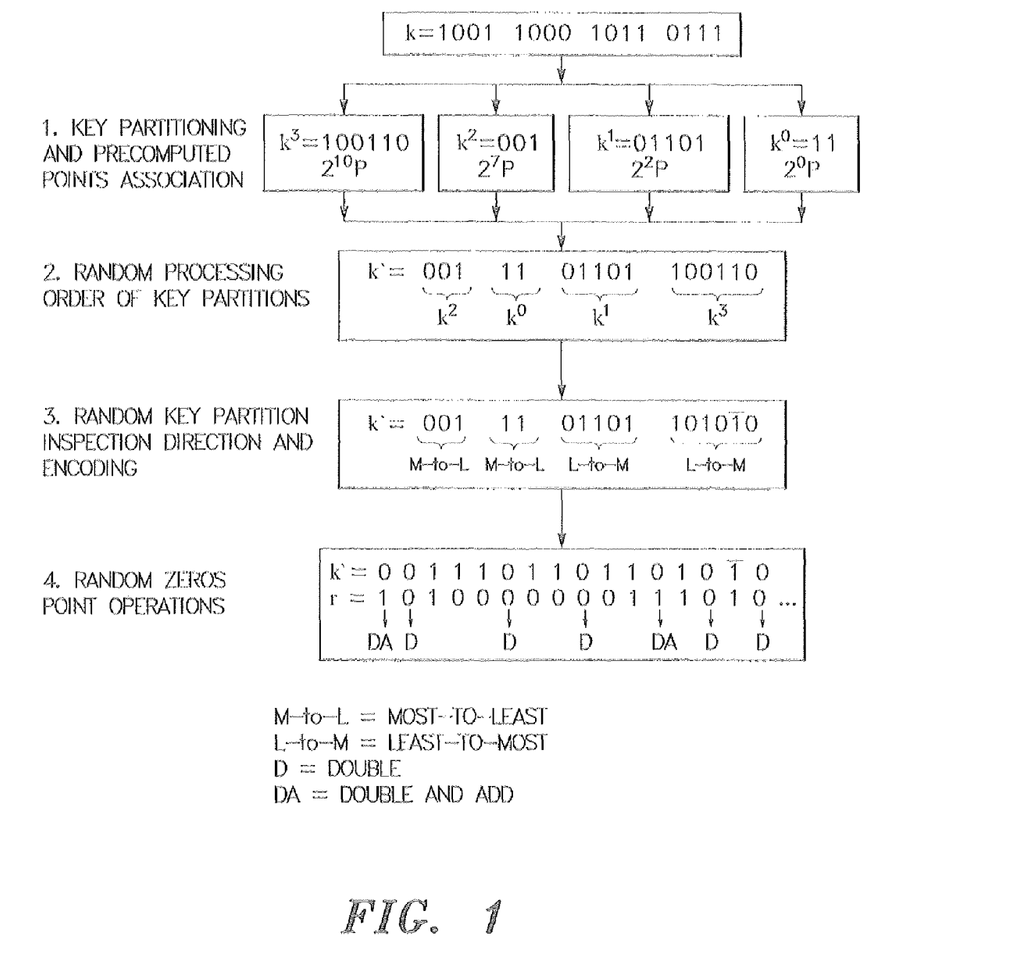
FIG. 1 is chart showing an exemplary partitioning of a private elliptic curve cryptographic key in accordance with a method for elliptic curve scalar multiplication according to the present invention.

FIG. 1 shows an example of key partitioning and execution scheduling. In the example of FIG. 1, the key length is 16 bits. The first step is to partition the key k into a random number of partitions (four in this example), i.e.:

$$k = k^{(3)} \| k^{(2)} \| k^{(1)} \| k^{(0)}. \qquad (6)$$

The second step is to randomly arrange the key partitions to form the new randomized key:

$$k_{new} = k^{(2)} \| k^{(0)} \| k^{(1)} \| k^{(3)}. \qquad (7)$$

The third step is to randomly encode each key partition either in binary or NAF representation and randomly assign the direction of inspection of key partition bits (most-to-least or least-to-most) if binary encoding is selected. Note that key partition $k^{(3)}$ is encoded in NAF representation. Finally, the fourth step shows how the random variable r is used to trigger dummy point addition operations for key bits with zero value.

Exemplary pseudocode for implementing the method of the present invention is shown in Algorithm 8. Key partitioning, pre-computations, and pre-computed point association with key partitions are assumed to be performed off-line. The key is partitioned into u partitions. Pre-computations are performed by repeated double operations in the first "for" loop according to key partition sizes. The number of required pre-computed points is (u−1). Each key partition $k^{(i)}$ is associated with a particular pre-computed point $P_i$ in the second "for" loop to keep the significance of each key partition.

---

Algorithm 8: Pseudocode

---

Inputs: P: Base Point, k: Secret key
Outputs: kP
Key Partitioning: $k = k^{(u-1)}||k^{(u-2)}||...||k^{(1)}||k^{(0)}$ for u key partitions
    with corresponding key partition lengths of:
    $L^{(u-1)}||L^{(u-2)}||...||L^{(1)}||L^{(0)}$
Initialization: Q = P, R = O
Precomputation:
$P_o = Q$
for i=1 to u−1 do
    for j=0 to $L^{(i-1)}$−1 do
        Q = 2Q
    end for
    $P_i = Q$
end for
Key Partitions Association with Pre-computed Points:
for i=0 to u−1 do ($k^{(i)}$, $P_i$)
Randomize key partitions → Let $k'^{(j)} = (k^{(i)}, P_i, L^{(i)})$ where, in
    general, j ≠ i and i, j = 0,1,...,u−1
Key after random rearrangement: $k' = k'^{(u-1)}||k'^{(u-2)}||...||k'^{(1)}||k'^{(0)}$
Scalar Multiplication ( R = kP )
for i=0 to u−1 do
    if (Binary) then
        if (most-to-least) then Q = Algorithm 6 ( $k'^{(i)}$ )
        else Q = Algorithm 7 ( $k'^{(i)}$ )
    else (NAF)
        j = 0, t = $k'^{(i)}$, Q[0] = $P_i$, Q[1] = O
        While t ≧ 1 do
            if t mod 2 = 1 then
                $k_j'^{(i)} = 2 - (t \bmod 2^2)$
                $t = t - k_j'^{(i)}$
            else
                $k_j'^{(i)} = 0$
            t = t/2, j = j + 1
            if( $k_j'^{(i)} = 1$ or r = 1) then Q[2] = Q[1] + Q[0]
            else if ( $k_j'^{(i)} = -1$ ) then Q[2] = Q[1] − Q[0]
            Q[0] = 2Q[0]
            Q[1] = Q[ 1+|$k_j'^{(i)}$| ]
        Q=Q[1]
    R = R + Q
end for

---

Scalar multiplication starts at the fourth "for" loop after random arrangement of key partitions. The inspection direction is randomly selected if a key partition is binary encoded. The pseudocode steps incorporate Algorithm 6 if the inspection direction is most-to-least and Algorithm 7 if the inspection direction is least-to-most. If NAF encoding is used, each bit of the scalar multiplier $k'^{(i)}$ is recoded in NAF representation and point operations are performed accordingly. Each partition is processed as if it is a key itself. The partial points resulting from processing the individualized key partitions are accumulated in the point R, which requires (u−1) extra point additions.

Although an attacker may be able to distinguish the double and add point operations, the adopted multilevel resistance measures do not allow the attacker to associate this operation with a specific key bit position on one hand, nor to ascertain a particular binary bit value involved in the operation.

The multilevel resistance measures will confuse prospective attackers regarding the exact bit positions of the key since: (1) key partitions are processed in a randomized order; (2) the inspection direction of key partitions that are encoded in binary is randomized (either most-to-least or least-to-most); and (3) key partitions that are NAF encoded may have a size that is greater by one bit than its corresponding binary encoded partition size.

Furthermore, key bit values cannot be definitely ascertained by prospective attackers. Even if a given bit appears to an attacker as if it is a binary 1, its true value cannot be ascertained, since this bit may (1) have a true binary 1 value, (2) have a true binary 0 value with a dummy add operation, or (3) have a $\bar{1}$ value in case of NAF encoding. Likewise, a recognized zero bit may be (1) a true zero in the binary form, or (2) a zero in a NAF encoding.

Resistance against the double attack is achieved because double attack targets the most-to-least version of the double-and-add algorithm. A cryptoprocessor implementing the method of the present invention is designed to perform both versions of the double-and-add algorithm, even at the key partition level.

Furthermore, the sequential architecture is also secure against RPA and ZPA. To protect against RPA and ZPA, either the base point P or the secret scalar k should be randomized. In the method of the present invention, key partitioning, together with the random processing order scheme, random partition encoding, random partition bits inspection direction, and random dummy additions, makes the secret scalar k appear as if it is totally randomized.

The multilevel randomization techniques make it very difficult to establish a correlation between the secret information and addresses of registers. Thus, the cryptoprocessor is secure against ADPA.

Even though increasing the number of key partitions provides more security, an increased number of key partitions (u) results in more space overhead, since the number of pre-computed points (u−1) will increase accordingly. Likewise, the delay overhead will also increase by increasing the number of key partitions, since (u−1) extra point additions are required to assimilate the partial results to produce the scalar product kP.

NAF encoding requires, on the average, $$\frac{m}{3}$$

point additions and, hence, provides better time performance than binary encoding, which requires, on the average, $$\frac{m}{2}$$

point additions. NAF encoding, however, requires signed bit representation and may increase the size of key partition by, at most, 1 bit.

The inspection direction does not cause any delay overhead, since the time required to perform scalar multiplication using Algorithm 6 is the same time required by Algorithm 7, which requires one more point storage than Algorithm 6 requires.

While dummy computations caused by the randomized bit algorithms (Algorithms 6 and 7) increase the degree of confusion, they do increase the number of point additions. Although this may significantly increase the time overhead, it is still a more attractive approach compared to the double-and-add-always algorithm (Algorithms 3 and 4).

Figure 4:
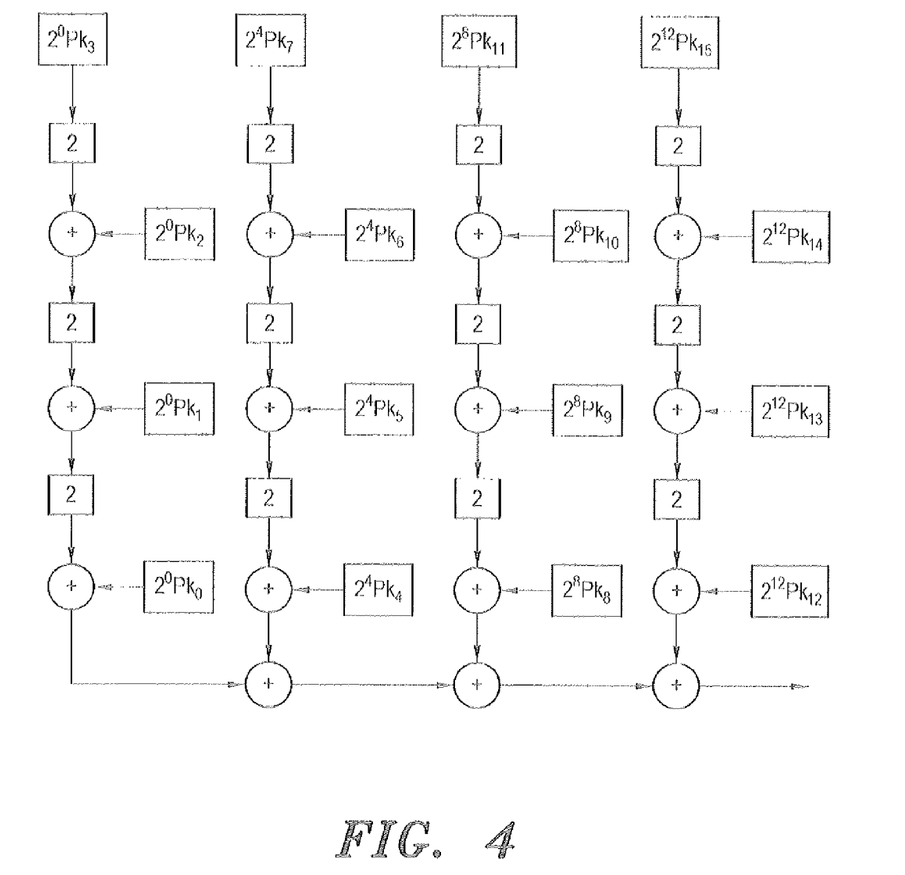
FIG. 4 diagrammatically illustrates data flow in the method for elliptic curve scalar multiplication according to the present invention.

FIG. 4 illustrates the data path of the above scalar multiplication method with m=16, u=4 and equal size partitions. In FIG. 4, each block containing a "2" represents a point doubling operation. Each circle containing a "+" represents a point addition operation. Each key partition k(i) is associated with a pre-computed point in the top of the data path. Each key partition k(i) is processed in an individual column in FIG.

4 by an individual processor. The resulting points of processing these key partitions are assimilated at the end to produce kP.

Figure 7:
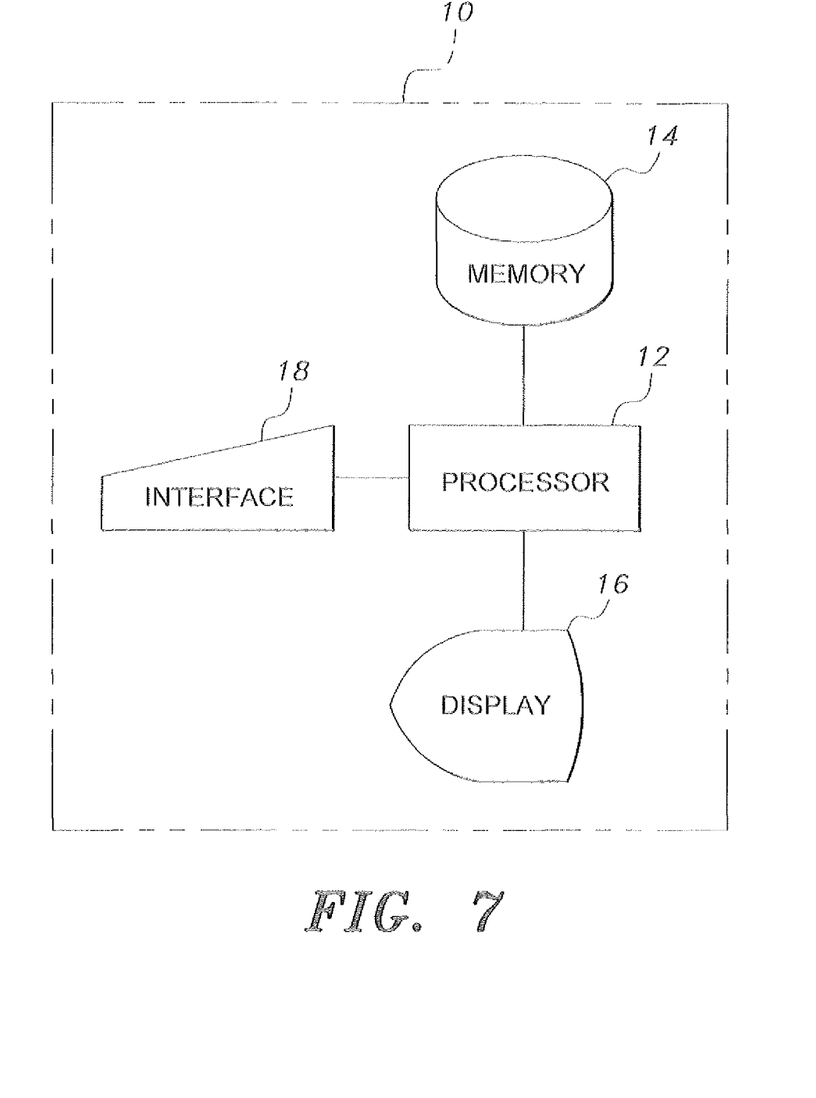
FIG. 7 is a block diagram illustrating exemplary system components for implementing the method for elliptic curve scalar multiplication.

FIG. 7 illustrates a generalized system 10 for implementing the scalar multiplication method, although it should be understood that the generalized system 10 may represent a stand-alone computer, computer terminal, portable computing device, networked computer or computer terminal, or networked portable device. It will further be understood that the system illustrated in FIG. 7 is exemplary only of one system or mode for carrying out the method, and most accurately depicts a computer. The method may also be implemented in software, smart cards, circuits, processors, or application specific integrated circuits (ASICs) designed to carry out the method. Data may be entered into the system 10 by the user via any suitable type of user interface 18, and may be stored in computer readable memory 14, which may be any suitable type of computer readable and programmable memory. Calculations are performed by the processor 12, which may be any suitable type of computer processor, and may be displayed to the user on the display 16, which may be any suitable type of computer display.

The processor 12 may be associated with, or incorporated into, any suitable type of computing device, for example, a personal computer or a programmable logic controller. The display 16, the processor 12, the memory 14, the user interface 18 and any associated computer readable media are in communication with one another by any suitable type of data bus, as is well known in the art. Additionally, other standard components, such as a printer or the like, may interface with system 10 via any suitable type of interface.

Examples of computer readable media include a magnetic recording apparatus, an optical disk, a magneto-optical disk, and/or a semiconductor memory (for example, RAM, ROM, etc.), or any other form of tangible media, but does not extend to purely transitory electronic signals. Examples of magnetic recording apparatus that may be used in addition to memory 14, or in place of memory 14, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

In an alternative embodiment of the method, the sequential pre-computations are replaced with parallelizable post-computations. Multiplier k is partitioned into u partitions, as in the above, that can be processed in parallel by u processors. Post-computations are then distributed on u−1 processors to be performed in parallel. The points that result from processing these key partitions with the post-computations are finally assimilated to produce kP.

Figure 5:
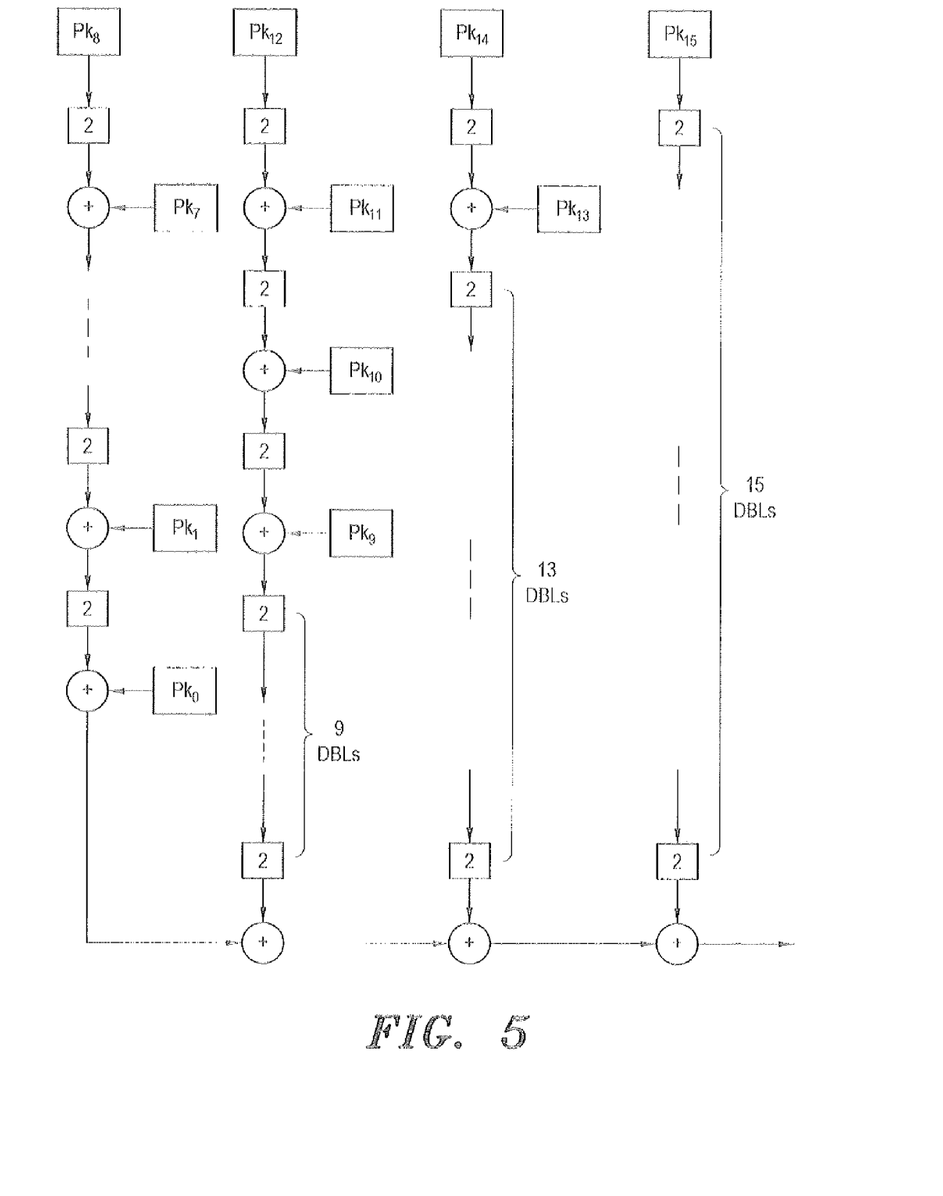
FIG. 5 diagrammatically illustrates data flow in an alternative embodiment of the method for elliptic curve scalar multiplication.

FIG. 5 illustrates the data path of this alternative embodiment, once again with m=16 and u=4. Each key partition k(i) has a different size and is processed in an individual column in FIG. 5 by an individual processor. The resulting points of processing these key partitions are assimilated at the end to produce kP.

As in the above, we begin by expressing k as:

$$k=k^{(u-1)}\|k^{(u-2)}\|\ldots\|k^{(1)}\|k^{(0)} \quad (8)$$

However, we also let k=($k_{m-1}, \ldots, k_0$) (i.e., the binary representation of multiplier k), where $k_{m-1}$ is the most significant bit of k. We also let u be a small integer and assign $$v = \frac{m}{u}.$$

Next, (uv−m) zero bits are appended to the left of the binary representation of k, and the resulting bit string is partitioned into u partitions, each of length v. The partitioned multiplier is given above in equation (8).

The scalar multiplication product kP can then be computed as $$kP=2^v(\ldots 2^v(2^v k^{(u-1)}P+k^{(n-2)}P)+\ldots +k^{(1)}P)+k^{(0)}P, \quad (9)$$

where $k^{(i)}P$ is given by $$k^{(i)}P=2(\ldots 2(2k_{iv+v-1}P+k_{iv+v-2}P)+\ldots +k_{iv+1}P)+k_{iv+0}P, \quad (10)$$

where $0 \leq i \leq u-1$.

Figure 6:
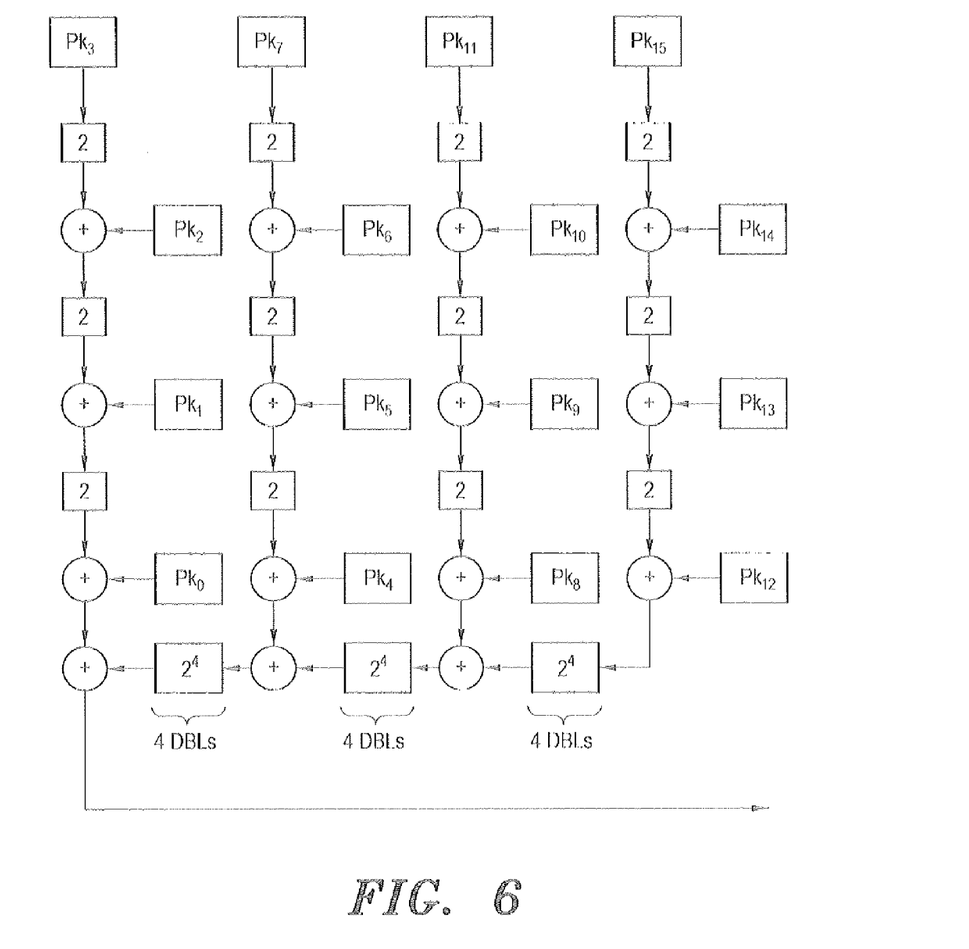
FIG. 6 diagrammatically illustrates data flow in the alternative embodiment of the method for elliptic curve scalar multiplication of F with specified values of m=16, u=4 and v=4.

FIG. 6 illustrates the data path of the alternative embodiment with m=16, u=4 and v=4. Each key partition k(i) is processed in an individual column in FIG. 5 by an individual processor. The resulting points of processing a key partition $k^{(i)}$, for $0<i\leq u-1$, are then added to the result of processing the key partitions, with $i<j\leq u-1$, and doubled v times (as implied by equation (9)).

The above alternative embodiment requires no pre-computations and removes the redundant doubling operations of the previous embodiment, although the propagation delay of the result of processing key partition $k^{(u-1)}$ until reaching the result of $k^{(0)}$ is still relatively high. Key partition $k^{(0)}$, however, requires no doubling after adding the result of the other key partitions. It should be noted that this method can be pipelined efficiently when proper scheduling is used and a proper sizing of $k^{(0)}$ is used. Thus, throughput is increased according to the number of employed processors.

In addition to the countermeasures of the previous embodiment, the above alternative method further increases resistance against power analysis attacks. It should be noted that this method requires no pre-computations and the post-computational overhead is overlapped with the processing time of the key partitions. Scalar multiplication pipelining, on the other hand, makes it almost impossible for an attacker to guess which bit belongs to which request. Thus, two different levels of security are involved in this alternative embodiment.

It is to be understood that the present invention is not limited to the embodiments described above, but encompasses any and all embodiments within the scope of the following claims.

We claim:

1. A method for elliptic curve scalar multiplication of a private key k with a point P for communications in an electronic communications system encrypted using elliptic curve cryptography, comprising the steps of:
   (a) representing an elliptic curve private key k in binary form as k=($k_{m-1}, \ldots, k_0$), wherein m is an integer and $k_{m-1}$ is a most significant bit of k;
   (b) defining an integer value u and a rational number v, wherein $$v = \frac{m}{u};$$

(c) appending (uv−m) zero bits to a left side of the binary representation of k to form an appended elliptic curve private key;

(d) partitioning the appended elliptic curve private key into u partitions, each of the partitions having a length v, such that $k=k^{(u-1)}\|k^{(u-2)}\|\ldots\|k^{(1)}\|k^{(0)}$;

(e) distributing each of the partitions to a respective one of u is parallel processors;

(f) computing by a computing device a scalar multiplication product kP as $kP=2^v(\ldots 2^v(2^v k^{(u-1)}P+k^{(u-2)}P)+\ldots+k^{(1)}P)+k^{(0)}P$, where $k^{(i)}P=2(\ldots 2(2k_{iv+v-1}P+k_{iv+v-2}P)+\ldots+k_{iv+1}P)+k_{iv+0}P$ for $0\leq i\leq u-1$, each $k^{(i)}P$ being computed on a respective one of the u parallel processors, the computations of $k^{(i)}P$ being computed simultaneously in parallel.

2. A system for performing elliptic curve scalar multiplication of a private key k with a point P for elliptic curve cryptography, comprising:

a plurality of parallel processors;

computer readable memory coupled to the processor;

a user interface coupled to the processor;

a display; and software stored in the memory and executable by the processor, the software having:

means for representing an elliptic curve private key k in binary form as $k=(k_{m-1},\ldots,k_0)$, wherein m is an integer and $k_{m-1}$ is a most significant bit of k;

means for defining an integer value u and a rational number v, wherein $$v = \frac{m}{u};$$

means for appending (uv−m) zero bits to a left side of the binary representation of k to form an appended elliptic curve private key;

means for partitioning the appended elliptic curve private key into u partitions, each of the partitions having a length v, such that $k=k^{(u-1)}\|k^{(u-2)}\|\ldots\|k^{(1)}\|k^{(0)}$;

means for distributing each of the partitions among a processors in the plurality of parallel processors; and means for computing a scalar multiplication product kP as $kP=2^v(\ldots 2^v(2^v k^{(u-1)}P+k^{(n-2)}P)+\ldots+k^{(1)}P)+k^{(0)}P$, where $k^{(i)}P=2(\ldots 2(2k_{iv+v-1}P+k_{iv+v-2}P)+\ldots+k_{iv+1}P)+k_{iv+0}P$ for $0\leq i\leq u-1$, each $k^{(i)}P$ being computed on a respective one of the u processors, the computations of $k^{(i)}P$ being computed simultaneously in parallel.

3. A computer software product that includes a non-transitory computer medium readable by a processor, the medium having stored thereon a set of instructions for performing elliptic curve scalar multiplication of a private key k with a point P for elliptic curve cryptography, the instructions comprising:

(a) a first set of instructions which, when loaded into main memory and executed by the processor, causes the processor to represent an elliptic curve private key k in binary form as $k=(k_{m-1},\ldots,k_0)$, wherein m is an integer and $k_{m-1}$ is a most significant bit of k, and store the binary representation in computer readable memory;

(b) a second set of instructions which, when loaded into main memory and executed by the processor, causes the processor to define an integer value u and a rational number v, wherein $$v = \frac{m}{u};$$

(c) a third set of instructions which, when loaded into main memory and executed by the processor, causes the processor to append (uv−m) zero bits to a left side of the binary representation of k to form an appended elliptic curve private key;

(d) a fourth set of instructions which, when loaded into main memory and executed by the processor, causes the processor to partition the appended elliptic curve private key into u partitions, each of the partitions having a length v, such that $k=k^{(u-1)}\|k^{(u-2)}\|\ldots\|k^{(i)}\|k^{(0)}$;

(e) a fifth set of instructions which, when loaded into main memory and executed by the processor, causes the processor to distribute each partition to a respective one of u parallel processors;

(f) a sixth set of instructions which, when loaded into main memory and executed by the processor, causes the processor to compute a scalar multiplication product kP as $kP=2^v(\ldots 2^v(2^v k^{(u-1)}P+k^{(u-2)}P)+\ldots+k^{(1)}P)+k^{(0)}P$, where $k^{(i)}P=2(\ldots 2(2k_{iv+v-1}P+k_{iv+v-2}P)+\ldots+k_{iv+1}P)+k^{iv+0}P$ for $0\leq i\leq u-1$, each $k^{(i)}P$ being computed on a respective one of the u parallel processors, the computations of $k^{(i)}P$ being computed simultaneously in parallel.

* * * * *